Jan. 24, 1961  S. GRÖGER  2,969,007
SHUTTERS FOR CAMERAS AND THE LIKE
Filed Dec. 24, 1957

INVENTOR

United States Patent Office 2,969,007
Patented Jan. 24, 1961

2,969,007

SHUTTERS FOR CAMERAS AND THE LIKE

Silvester Gröger, Wuppertal-Elberfeld, Germany, assignor to Hora-Werk G.m.b.H., Enningloh, Germany Filed Dec. 24, 1957, Ser. No. 704,989

4 Claims. (Cl. 95—56)

The present invention relates to photography, and more particularly to camera shutters and diaphragms.

Photographic cameras usually include, in addition to the shutter, a diaphragm designed to enlarge or restrict the area of the opening through which light is admitted into the camera. The principal types of diaphragm are the hole type, and the iris type of diaphragms. The iris diaphragms are most frequently employed in modern cameras; usually, they are arranged directly in the front or to the rear of the shutter lamellae. On optical grounds, it would be highly desirable to dispose the shutter lamellae and the diaphragm lamellae in one and the same plane.

Iris diaphragms are relatively complex devices comprising quite a number of steel lamellae which are displaced by a ring or disc. Due to the mutual friction of the diaphragm components, the adjustment of the diaphragm which conventionally is effected manually, requires a certain force. This force is sufficiently great that an automatic adjustment, for example by means of an electric exposure meter, is not feasible, at least not in any resonably simple manner.

It is an object of the present invention to provide, in response to the desideratum in the art referred to above, a combined shutter and diaphragm mechanism wherein the shutter and diaphragm lamellae not only are disposed in the same plane, but moreover form an integral whole whereby to enhance not only the optical aspects but also the simplicity of the mechanism.

It is a further object of the invention to provide a combined shutter and diaphragm mechanism wherein the force required for varying the diaphragm opening is so small as to permit of an automatic adjustment thereof by means of an electric exposure meter.

Other objects, and the manner in which the same are attained, will become apparent as this specification proceeds.

The invention contemplates providing a shutter comprising a plurality of, and preferably two, mutually displaceable lamellae which function as the shutter as well as the diaphragm lamellae. In consequence, the shutter lamellae and the diaphragm lamellae are not only disposed in one and the same plane, but moreover, they are intercombined to form an integral whole. The resulting shutter is simple to make, and the adjustment of the size of the shutter opening requires so little force that it may be effected by means of an electric exposure meter. As contemplated by the invention, the lamellae are provided with apertures which, on displacement of the lamellae toward one another, overlap more or less so as to form the shutter opening. The apertures in the lamellae, for example, may be provided in the form of squares, one diagonal of either square coinciding with the line which, in the direction of displacement of the lamellae, traverses the center of the shutter.

The adjustable displacement of the lamellae is effected by actuating members arranged for displacement along a path the length of which can be adjusted, for example by a displaceable stop element, means being provided for automatically returning these actuating members into their initial positions. In a preferred embodiment of the invention, the shutter is disposed in an annular casing. The displacement of the lamellae is effected by means of a ring which is arranged for rotation, within adjustable limits and in opposition to the action of a return spring, in the casing; this ring is connected with the lamellae by guide rods which engage the lamellae by means of pins mounted on the guide rods and guided in corresponding straight slots provided in a partition in the casing. For the purpose of an adjustable limitation of its rotary displacement, the ring carries a pin which engages a circular slot in the partition, the effective length of this slot being variable by a corresponding displacement of a stop for the pin. A preferred embodiment of this adjustable stop involves an annular disc provided on the side of the casing partition opposite to that on which rotary ring is arranged; this annular disc is provided with a circular slot precisely corresponding to the circular slot in the partition, and having a chamfered edge serving as a stop for the pin which, mounted on the annular ring, traverses both the said slots. Apart from a slight friction, the turning of this annular disc meets with no resistance whatever, so that it may be coupled with, and automatically adjusted by, an exposure meter.

In order to turn, within certain limits, the ring causing the lamellae to be displaced when the shutter is actuated, this ring is coupled, resiliently, with a second ring provided for rotation in the casing and for being taken along by a spring-loaded tension ring also arranged for rotation in the casing, whenever the same is released from its tensioned position. Preferably, the second rotary ring is provided with a cam which in the tensioned position of the tension ring, is engaged by a catch linked to the tension ring, means being provided for withdrawing this catch from said cam toward the end of the rotary displacement of the tension ring, following its release.

In the drawing accompanying the present specification and forming part thereof, an embodiment of the invention is illustrated diagrammatically by way of example.

Figure 1:
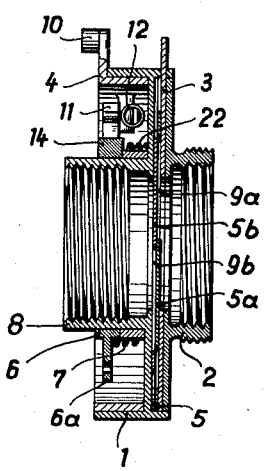
Fig. 1 is an axial section through a shutter according to the invention.

Referring to the drawing wherein like elements are denoted by identical reference numerals, the shutter casing is shown at 1. To the rear of this casing, a threaded flange 2 is provided in a manner such that a hollow space remains for accommodating a diaphragm stop disc 3 and two shutter and diaphragm lamellae 5, the structure and function of which will be explained below. A rotary tension ring 4 is inserted in the casing 1. Two rotary rings 6 and 7 are mounted on a threaded shoulder 8 of the casing; the interior thread of this shoulder serves for engaging and supporting the components of the lens mount.

Figure 2:
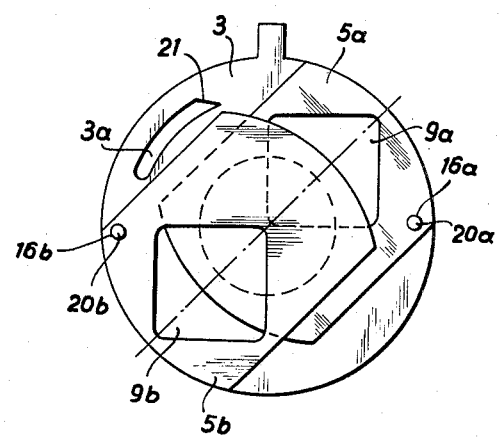
Fig. 2 is a front view of a detail of Fig. 1, including two shutter and diaphragm lamellae and the adjustable diaphragm stop disc.

The lamellae 5, which in Fig. 2, are individually denoted with 5a and 5b, are arranged in the casing 1 for mutual displacement toward and away from one another, the length of the path of this displacement being variable or adjustable in such a manner that the area of the shutter opening is varied or adjusted correspondingly. For this purpose, the two lamellae are provided with cutouts or openings 9a and 9b, which in the embodiment shown in Fig. 2, are provided substantially in the form of squares, one diagonal of each of these square coinciding with the line which in the direction of displacement of the lamellae, traverses the center of the shutter. The farther the lamellae are displaced toward one another, the greater becomes the extent to which the openings 9a and 9b overlap, and the larger becomes the shutter opening. The largest shutter opening (the smallest diaphragm number) is reached when the two openings 9a and 9b completely overlap so as to be completely superposed. Manifestly, the two lamellae 5a and 5b function as shutter lamellae as well as diaphragm lamellae. Both lamellae are provided with lateral bores 16a or 16b which are engaged by the pins 20a and 20b for actuating or displacing the lamellae. The lamellae are supported in front of a ring disk 3 arranged in the casing 1 for rotation within certain limits.

The following description refers to those components which serve for actuating the lamellae 5, and further to the mechanism which in conjunction with these components, controls the length of the path through which the lamellae are displaced. The actuation of the lamellae and thus of the shutter, is effected by means of the rings 6 and 7 in conjunction with the tension ring 4. As is apparent particularly from Fig. 3, the ring 6 is provided with a downwardly extending tongue 6a and with a cam 14 disposed at the top, directly opposite the tongue 6a. The ring 7 which is not seen in Fig. 3 as it is covered by the ring 6, is provided with two outwardly directed tongues 7a and 7b which are disposed in precise diametrical opposition. A coil spring 17 one end of which is attached to the tongue 6a of the ring 6, while the other end is attached to the tongue 7b of the ring 7, serves for resiliently coupling the two rings 6 and 7 to one another. Guide rods 19a and 19b are linked to the tongues 7a and 7b, respectively, and carry on their free end pins 20a and 20b, which project through straight slots 1a and 1b disposed in the casing 1 in parallel to the direction of displacement of the lamellae, to engage the bores 16a and 16b disposed in the lamellae 5a and 5b, as noted above. When the ring 7 of which only the tongues 7a and 7b are visible in Fig. 3, as noted above, is turned clockwise in Fig. 3, the pins 20a and 20b are displaced in the corresponding slots 1a and 1b. Inasmuch as the pins 20a and 20b engage the lamellae 5a and 5b, the turning of the ring 7 results in a mutual displacement of the lamellae. The tongue 7a of the ring 7 mounts further a pin 7c which projects through an arched slot 1c provided in the casing 1. Manifestly, the ring 7 can be turned only within the limits defined by the length of the slot 1c.

Figure 4:
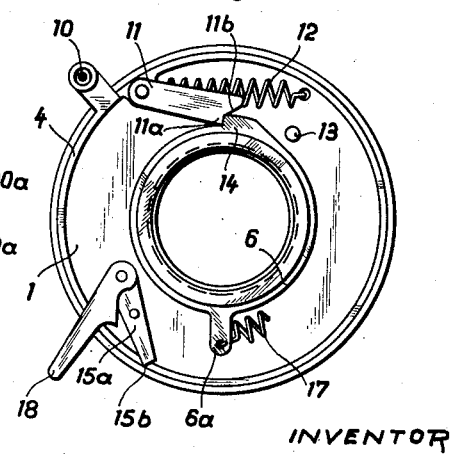
Fig. 4 is a similar front view showing the tension ring in its tensioned position.

The shutter is actuated by means of the tension ring 4 which in its tensioned position, is shown in Fig. 4. The tensioning of the ring 4 is effected, counter-clockwise, by means of the hand lever 10 which projects from the casing 1, such tensioning overcoming the force of the spirng 12 one end of which is attached to the tension ring 4 while its other end is mounted on the casing 1. A pawl 11 is linked to the upper rim of the ring 4 and is designed, when the ring is being tensioned, to pass across the cam 14 on the ring 6 and to engage, with a shoulder 11a, the left side of the cam 14. A detent 15a is also provided in the casing 1 for arresting the ring 4 in its tensioned position, at 15b. This detent is released, and the tensioned ring 4 is thus unlocked, by means of a trigger 18. When the trigger 18 is depressed, the projection provided on its inner side pushes against a pin mounted on the detent 15a, thus causing the detent to disengage the tension ring 4. The tension ring then rotates clockwise under the influence of the spring 12, and by means of the catch 11, takes along the ring 6 until, shortly before the ring 4 reaches its end position, the catch 11 with its chamfered edge 11b abuts against the stop pin 13 mounted in the casing 1 whereby it is withdrawn from the cam 14. While rotating, the ring 6, owing to the presence of the spring 17, takes along the ring 7 and turns the same clockwise to the extent permitted by the limitation placed on the displacement of the pin 7c, by the slot 1c. In consequence, the lamellae 5a and 5b are displaced so as to assume their open positions. The rotation of the ring 7 is effected in opposition to the force of the spring 22 which, as shown in Fig. 1, encircles the ring 7. As soon as the catch 11 provided on the tension ring 4, has been withdrawn from the cam 14 provided on the ring 6, the spring 22 returns the ring 7 into its initial position while simultaneously, the lamellae 5a and 5b are returned into their closed positions and the ring 6, by means of the spring 17, is returned into its initial position. When the ring 4 has been tensioned once again, the shutter is opened by a depression of the trigger 18, whereupon the shutter closes automatically.

The length of the path traveled by the lamellae 5 in the course of their displacement, or the distance by which the lamellae are displaced toward and away from one another, is controlled or adjusted in the following manner. The ring disk 3 which is free to rotate within certain limits, and which is placed to the rear of the lamellae, is provided with an arch-shaped slot 3a, shown in Fig. 2, which is disposed precisely to the rear of the slot 1c provided in the casing 1. This slot 3a is provided, at its upper right end, with a stop edge 21 which is also seen, through the slot 1c, in Fig. 3. Since the pin 7c projects through the slot 1c into the slot 3a, the stop edge 21 limits the length of the path of the pin 7c in the slot 1c, and thus limits the rotary displacement of the ring 7 as well as the mutual longitudinal displacement of the lamellae 5. In the initial position of the ring disk 3 shown in Figs. 2 and 3, the path of the pin 7c in the slot 1c is so adjusted that the ring can be turned only to a point where by the mutual displacement of the two lamellae, the openings 9a and 9b provided therein are precisely superposed. When the ring disk 3 is turned counterclockwise, the resulting displacement of the stop edge 21 reduces the length of the path the pin 7c is permitted to travel in the slot 1c. In consequence, the lamellae can execute only a corresponding part of their mutual displacement and the openings 9a and 9b can overlap only partly, with the result that the shutter opening is reduced correspondingly. The size of the shutter opening thus can be precisely adjusted by a corresponding rotation of the ring disk 3, i.e. the diaphragm effect of the lamellae can be adjusted in the simplest possible manner by means of the stop edge 21. For this reason, the ring disk 3 may be called the diaphragm setting disk.

As already noted, the return of the rings 6 and 7 into their initial positions and consequently, the displacement of the lamellae into their closed position shown in Fig. 2, can commence only when the catch 11 on the tension ring has been withdrawn from the cam 14 on the ring 6. Once the rotary displacement of the ring 7 has been arrested by the abutment of the pin 7c on the stop edge 21, the ring 6 must be rotated further, under the influence of the spring 12, until the catch 11 disengages the cam 14. This implies overcoming the force of the spring 17 which is tensioned the more, the sooner the ring 7 has been arrested. The spring 17 thus is required to be correspondingly weaker than the spring 12, attention being paid to the fact that the less the return spring 22 for the ring 7 is tensioned, the smaller is the rotary displacement of the ring 7.

Figure 3:
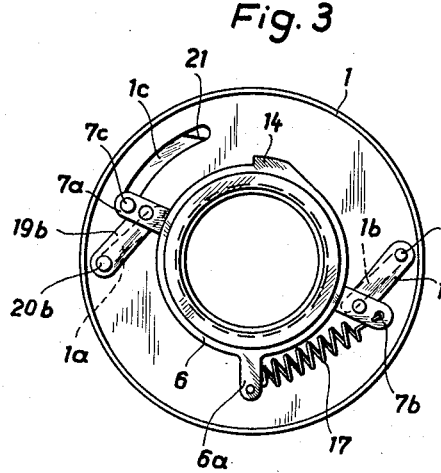
Fig. 3 is a front view of the shutter casing shown in Fig. 1, with the tension ring omitted for sake of clarity.

The stop edge 21, as shown in Figs. 2 and 3, extends obliquely to the direction of displacement of the pin 7c. In consequence, the abutment of the pin 7c effects an arrest of the diaphragm setting disk 3 so that the abutment of the pin 7c cannot result in any rotation of the setting disk. As the rotary displacement of the disk 3 for the purpose of setting the diaphragm does not meet with any substantial resistance, the diaphragm setting disk 3 can be coupled with an exposure meter.

The invention is, of course, susceptible of a great many variations and modifications in addition to the embodiment described above for explanation and illustration purposes only. Thus, for example, the number of lamellae, or the number and form of the openings provided therein, may be varied as desired. Also, equipment may be incorporated which permits varying and adjusting the speed or exposure time of the shutter. All that is essential in accordance with the invention is that lamellae are used which are mutually displaceable in an adjustable manner, and which function as the shutter as well as the diaphragm lamellae. It goes without saying that a variation of the size of the shutter opening has no influence on the shutter speed or exposure time to which the shutter happens to be set.

I wish it to be understood that I do not desire to be limited to the details of construction, design, arrangement or operation shown and described herein as quite a number of modifications within the scope of the following claims are likely to occur to workers in this field, which would not depart from the spirit of this invention nor involve any sacrifice of the advantages thereof.

I claim:

1. A shutter, particularly adapted for use in photographic cameras, comprising two mutually displaceable lamellae serving as the shutter as well as diaphragm lamellae, and means for variably adjusting the extent of such mutual displacement comprising an annular casing surrounding the shutter, a ring arranged for rotary displacement in said casing, a return spring arranged to oppose said rotary displacement, a partition in said casing, an arch-shaped slot in said casing partition, a pin on said rotary ring engaging said arch-shaped slot, adjustable stop means for varying the effective path of said pin in said slot whereby to correspondingly limit the rotary displacement of said ring, guide links linked to said ring, straight slots in said partition, and pins on said guide links guided in said straight slots and engaging said lamellae.

2. A shutter according to claim 1, wherein said adjustable stop means comprises a rotary ring disk provided on that side of the casing partition which is opposite to that on which the rotary ring is arranged, said ring disk having an arch-shaped slot corresponding to the arch-shaped slot in said partition, the slot in the ring disk including a chamfered end edge, the pin on the rotary ring projecting through both the said arch-shaped slots and said chamfered edge serving as a limit stop for the said pin.

3. A shutter according to claim 1, including a second ring arranged for rotary displacement in the casing, resilient means coupling the first with said second rotary ring, a spring-influenced tension ring arranged for rotary displacement in the casing, means for releasing said tension ring from its tensioned position, and means for causing said tension ring to take along said second rotary ring following such release.

4. A shutter according to claim 3, including a cam on the second rotary ring, a catch linked to the tension ring and arranged to engage said cam in the tensioned position of said tension ring, and means for withdrawing said catch from said cam toward the end of the rotary displacement of the released tension ring.

References Cited in the file of this patent

UNITED STATES PATENTS

| | | |
|---|---|---|
| 340,213 | Hoedemaker et al. | Apr. 20, 1886 |
| 369,997 | Simon | Sept. 13, 1887 |
| 798,595 | Brueck | Sept. 5, 1905 |